No. 660,446. Patented Oct. 23, 1900.
H. O. LITTLE.
FRUIT BOX OR BASKET.
(Application filed May 19, 1900.)
(No Model.)
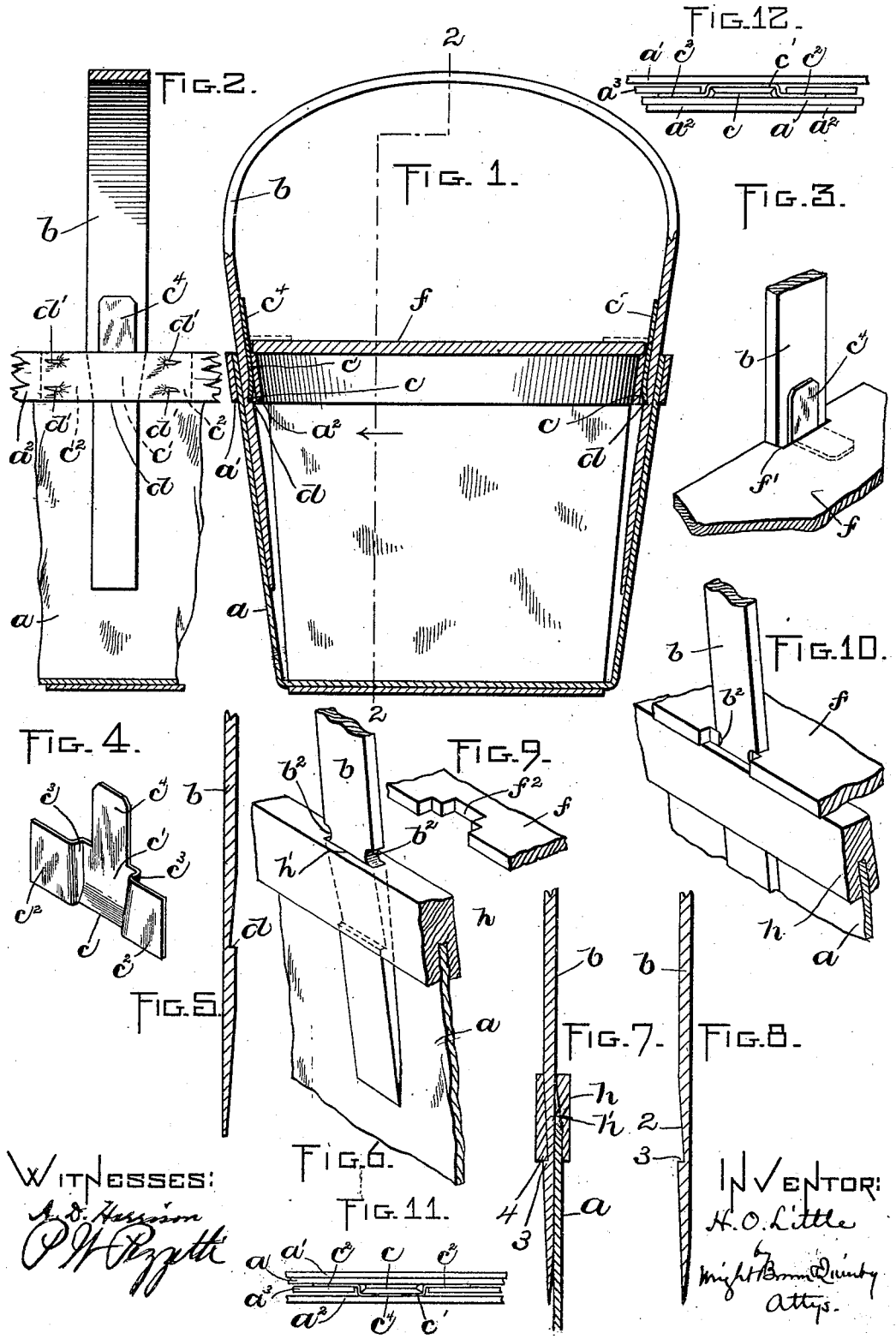
WITNESSES:
INVENTOR:
H. O. Little

UNITED STATES PATENT OFFICE.

HENRY O. LITTLE, OF BRIDGEWATER, MASSACHUSETTS.

FRUIT BOX OR BASKET.

SPECIFICATION forming part of Letters Patent No. 660,446, dated October 23, 1900.

Application filed May 19, 1900. Serial No. 17,237. (No model.)

*To all whom it may concern:*

Be it known that I, HENRY O. LITTLE, of Bridgewater, in the county of Plymouth and State of Massachusetts, have invented certain new and useful Improvements in Fruit Boxes or Baskets, of which the following is a specification.

This invention relates to wooden boxes or baskets used to contain fruit, such as grapes;
and it has for its object, first, to provide a simple, effective, and inexpensive construction whereby the handle made as a separate piece from the box or basket can be inseparably locked thereto by the simple operation of inserting the ends of the handle in sockets formed for their reception in the rim of the box or basket.

The invention also has for its object to provide improved means for securing the cover of a box or basket of the character above specified in place.

The invention consists in the improvements which I will now proceed to describe and claim.

Of the accompanying drawings, forming a part of this specification, Figure 1 represents a transverse sectional view of a fruit box or basket embodying my invention. Fig. 2 represents a section on line 2 2 of Fig. 1 looking toward the left. Fig. 3 represents a perspective view of a portion of the cover and a portion of the handle of the basket shown in Figs. 1 and 2. Fig. 4 represents a perspective view of one of the metal socket-pieces and cover-holders shown in Figs. 1 and 2. Fig. 5 represents a sectional view of a portion of the handle detached. Fig. 6 represents a perspective view of a portion of a fruit box or basket and its handle presenting a different embodiment of my invention. Fig. 7 represents a sectional view of the parts shown in Fig. 6. Fig. 8 represents a sectional view of the handle shown in Figs. 6 and 7 detached from the box or basket. Fig. 9 represents a perspective view of a portion of the cover used with the basket shown in Figs. 6 and 7. Fig. 10 represents a view similar to a portion of Fig. 6, showing the cover in place and interlocked with the handle. Fig. 11 represents a plan view of a portion of the upper edge or mouth of the box or basket shown in Figs. 1 and 2. Fig. 12 represents a view similar to Fig. 11, showing a modification hereinafter referred to.

The same reference characters indicate the same parts in all the figures.

Referring for the present to Figs. 1, 2, 3, 4, and 5, $a$ represents the body of the basket, which is preferably composed of thin strips or veneers of wood, strengthened or reinforced at the mouth of the basket by a narrow external strip $a'$ and an internal strip $a^2$, these parts being united along the rim portion of the basket by tacks or other suitable fastenings in a common and well-known manner. I provide the rim of the basket with two sockets adapted to receive the end portions of the handle $b$, each socket having at its lower edge a flexible locking-shoulder $c$, formed to engage a complemental locking-shoulder $d$, formed on the handle. The said sockets are preferably constructed by interposing between the inner strip $a^2$ and the sides of the basket two metallic socket-pieces of the form shown in Fig. 4, each socket-piece being made of a single piece of sheet metal and comprising a central portion $c'$, the lower edge of which constitutes the locking-shoulder $c$, above described, two end portions $c^2 c^2$, offset from the central portion $c'$ by shoulders $c^3 c^3$, and an upwardly-projecting tongue $c^4$. During the operation of assembling the parts of the basket the socket-pieces are placed against the inner sides of the body of the basket and the inner rim-strip $a^2$ is placed against the socket-piece, the whole being connected by tacks or other fastenings $d'$, driven through the strips $a' a^2$, the intermediate portion of the body of the basket, and the ears $c^2$ of the socket-pieces.

The central part $c'$ and the shoulders $c^3 c^3$ form three walls of a socket adapted to receive the end portions of the handle $d$. The said socket-piece and the inner strip $a^2$ are sufficiently flexible to permit the shoulder $c$ to yield when the ends of the handle are being inserted in the sockets until the shoulders $d$ of the handle pass below the shoulder $c$ of the sockets, whereupon the shoulder $c$ will spring into engagement with the shoulders $d$, as indicated in Fig. 1. When this takes place, the handle is locked to the basket. The ears $c^4$ of the socket-piece project upwardly at the inner sides of the side portions of the handle, as shown in full lines in Fig. 1. When the cover $f$ is applied to the box, the ears $c^4$ are bent down upon the upper surface of the cover, as indicated by dotted lines in Figs. 1 and 3, thus preventing the cover from being raised from the basket. The cover is provided with notches $f''$ to fit the handle, as shown in Fig. 3, the ends of said notches constituting shoulders which prevent endwise movement of the cover in either direction.

In Figs. 6, 7, 8, 9, and 10 I show an embodiment of my invention in which the upper edges of the strips forming the body $a$ of the basket are inserted in grooves formed in the lower edges of relatively thick and stiff strips $h$, which form the mouth of the basket, said strips being suitably united at the corners of the basket by tongue-and-grooved joints or otherwise. The strips $h$, extending along the sides of the basket, are provided with slots $h'$, which receive the end portions of the handle $b$. The end portions of the handle are provided in their outer surfaces with notches, each notch having an inclined longer side 2 and a shorter side or shoulder 3. When the ends of the handle are inserted in the slots $h'$, the flexibility of the wood at the sides of the slots permits the slots to yield to receive the thicker portions of the ends of the handle below the shoulders 3. The outer sides of the slots $h'$ spring inwardly when the shoulders 3 have passed below them, thus causing the lower edges or shoulders 4 on the pieces $h$ to spring into engagement with the shoulders 3, as shown in Fig. 7.

The cover $f$ used with the construction of box shown in Figs. 6 and 7 is provided with notches $f^2$, Fig. 9, the end portions of which engage notches $b^2$, formed in the end portions of the handle $b$, the cover being thus interlocked with the handle, so that it can neither move upwardly nor endwise.

It will be seen that the constructions above described provide, at a very low cost, means for quickly and inseparably securing a handle to a fruit box or basket and for satisfactorily securing the cover of such box or basket in place.

In Fig. 11 I show a plan view of a portion of the edge or mouth of the basket, illustrating the manner of incorporating the metal socket-piece in the said edge. I prefer to insert filling-pieces $a^3$ $a^3$ at opposite sides of the socket-piece, said pieces filling the crevices that would otherwise exist between the body $a$ and inner strip $a^2$ at the ends of the socket-piece.

If desired, the socket-pieces may be placed between the outer strip $a'$ and the body of the basket, as shown in Fig. 12, in which case the end portions of the handle will be on the outer surfaces of the basket-body sides and the shoulders $d$ will be on the outer sides of the handle ends.

It will be seen that in each embodiment of my invention the side and end pieces of the basket are provided with a thickened rim and that the handle-sockets extend through the rim from the upper to the lower edge thereof. The portions of the rim that form the sides of the socket are flexible and resilient, so that they are adapted to be separated by the wedge-shaped ends of the handle to permit the shoulders of the handle to pass through the sockets, the sockets then contracting to engage the shoulders of the handle and secure the handle to the rim. The sockets are offset from the adjacent side pieces of the basket, so that there is nothing below the sockets to obstruct the downward movement of the ends of the handle. Hence the ends can be quickly inserted and can be formed to extend to the bottom of the basket, if desired. Said handle ends bear closely against the side pieces and give marked strength and stiffness to the handle when the sockets are at the inner sides of the rim and the handle ends bear against the inner surfaces of the basket sides.

I claim—

1. A fruit box or basket having a thickened rim, and handle-sockets extending through the rim, each socket having its lower end offset from the adjacent side piece of the basket and provided with a locking-shoulder at one side of said lower end, to engage a complemental locking-shoulder on a handle inserted in the socket.

2. A fruit box or basket having a thickened rim, and handle-sockets extending through the rim, each socket having its lower end offset from the adjacent side piece of the basket and provided with a locking-shoulder, and a handle having complemental locking-shoulders on its end portions, adapted to engage the shoulders of the sockets.

3. A fruit box or basket having a thickened rim, and handle-sockets extending through the rim, each socket having its lower end located at the inner side of the adjacent side piece of the basket, and provided with a locking-shoulder, and a handle having complemental locking-shoulders on its end portions engaged with the shoulders of the sockets, said end portions being extended below the sockets and bearing against the inner surfaces of the side pieces of the basket.

4. A fruit box or basket having flexible side pieces, flexible rim-strips attached to said side pieces, and metallic socket-pieces interposed between said side pieces and rim-strips, said socket-pieces having socket-walls and also having handle-engaging shoulders at their lower edges.

5. A fruit box or basket having flexible side pieces, flexible rim-strips attached to said side pieces, and metallic socket-pieces interposed between said side pieces and rim-strips, said socket-pieces having socket-walls, handle-engaging shoulders at their lower edges, and cover-engaging ears at their upper edges.

In testimony whereof I have affixed my signature in presence of two witnesses.

HENRY O. LITTLE.

Witnesses:
C. F. BROWN,
E. BATCHELDER.